Jan. 4, 1938.  R. N. MARSHALL  2,104,433
ACOUSTIC DEVICE
Filed April 25, 1934  6 Sheets-Sheet 1

INVENTOR
R. N. MARSHALL
BY
Walter C. Kiesel
ATTORNEY

Jan. 4, 1938.  R. N. MARSHALL  2,104,433
ACOUSTIC DEVICE
Filed April 25, 1934   6 Sheets-Sheet 2
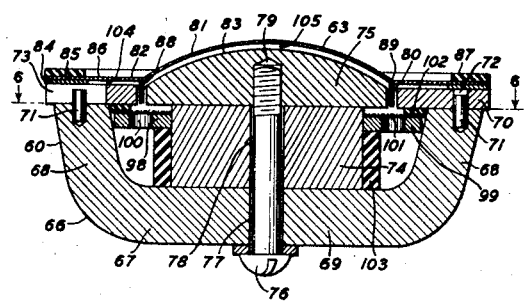
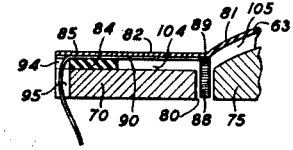
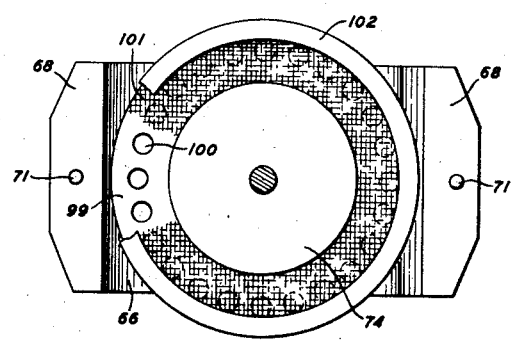
INVENTOR
R. N. MARSHALL
BY
Walter C. Kiesel
ATTORNEY Jan. 4, 1938.  R. N. MARSHALL  2,104,433
ACOUSTIC DEVICE
Filed April 25, 1934  6 Sheets-Sheet 3

INVENTOR
R. N. MARSHALL
BY
Walter C. Kiesel
ATTORNEY

Jan. 4, 1938.   R. N. MARSHALL   2,104,433
ACOUSTIC DEVICE
Filed April 25, 1934   6 Sheets-Sheet 4

INVENTOR
R. N. MARSHALL
BY
Walter C. Kiesel
ATTORNEY

Jan. 4, 1938. R. N. MARSHALL 2,104,433
ACOUSTIC DEVICE
Filed April 25, 1934 6 Sheets—Sheet 5

INVENTOR
R. N. MARSHALL
BY
Walter C. Kiesel
ATTORNEY

Jan. 4, 1938.  R. N. MARSHALL  2,104,433
ACOUSTIC DEVICE
Filed April 25, 1934  6 Sheets-Sheet 6

INVENTOR
R. N. MARSHALL
BY
Walter C. Kiesel
ATTORNEY

Patented Jan. 4, 1938

2,104,433

UNITED STATES PATENT OFFICE 2,104,433

ACOUSTIC DEVICE

Robert N. Marshall, Newark, N. J., assignor to Bell Telephone Laboratories, Incorporated, New York, N. Y., a corporation of New York Application April 25, 1934, Serial No. 722,269

9 Claims. (Cl. 179—115.5)

This invention relates to acoustic devices, and, more particularly, to electrodynamic microphones or transmitters.

An object of this invention is to simplify the structure and to improve the operating characteristics of acoustic devices, particularly of the electrodynamic type.

A feature of this invention comprises a microphone or transmitter having a casing entirely enclosing means for enhancing the response of its diaphragm to low frequency sound waves.

A further feature of this invention comprises an acoustic device having a diaphragm separated from a support by a spacer member cemented or otherwise adhesively secured to the peripheral portion of the diaphragm and to the support.

Still another feature comprises an acoustic device having a magnet structure containing an air-gap and damping means positioned thereunder, the damping means being engaged on each side by resilient members, for maintaining it in proper position.

Still other features will be evident from the detailed description which follows hereinafter.

A preferred embodiment of this invention comprises a microphone having a casing containing a magnet structure, and a diaphragm positioned at a perforated end portion of the casing, one side of the diaphragm being exposed directly to sound waves, through the perforated end portion. The magnet structure comprises, preferably, a bar magnet having bent end portions engaged by a preferably annular plate pole, a central cylindrical pole, and a dome-shaped, center pole-piece whose periphery is in spaced relation to the inner periphery of the plate pole to define an annular air-gap. The diaphragm is secured, preferably, by cement, at its peripheral portion to a spacing member or washer which is fastened, preferably by cement, to the plate pole. The diaphragm, preferably, comprises a central stiffened portion and an outer portion and has a moving coil attached to it at the junction of these portions. Under the air-gap in which the coil is positioned, a damping member is supported. This member comprises, preferably, a ring containing a multiplicity of holes covered by a cloth strip. On one side and at its outer peripheral portion, it is spaced from the plate pole by a resilient member or washer. On its other side and at its inner peripheral portion, it is engaged by the upper end of a sleeve member of resilient material, which fits about the cylindrical center pole and extends between the bar magnet and the damping member. The casing entirely encloses on the rear side of the diaphragm means for enhancing the low frequency response of the diaphragm. This means comprises, preferably, an elongated tubular member open at each end and having one open end adjacent an apertured wall portion of the casing preferably oppositely disposed with reference to the first mentioned casing end portion.

A more complete understanding of this invention will be obtained from the detailed description which follows, read with reference to the appended drawings, wherein:

Fig. 5 is a sectional view, on an enlarged scale, of the magnet structure and diaphragm assembly of the device of Fig. 1, removed from the casing thereof;

Fig. 6 is a plan view of the structure of Fig. 5 along the line 6—6 thereof, portions being broken away to show the details of the damping arrangement;

Fig. 7 is a side elevational view of the structure of Fig. 5;

Fig. 8 is a sectional view of a fragment of the structure of Fig. 5, and illustrates how the coil leads may be brought out from the moving coil;

Figs. 9, 10 and 11 show alternative ways of bringing out the coil leads;

Figure 1:
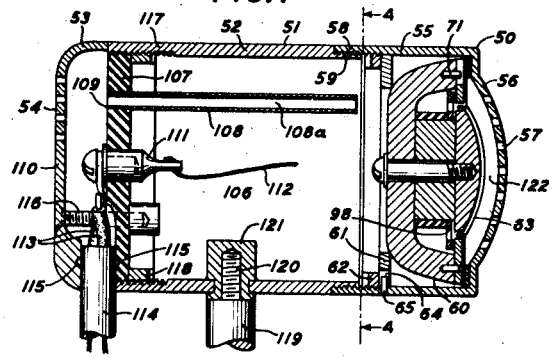
Fig. 1 is a sectional view of an acoustic device constituting a preferred embodiment, actual size, of this invention.
Figure 2:
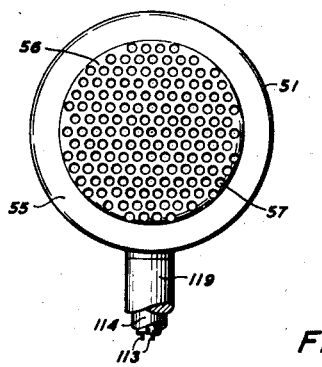
Fig. 2 is a front view of the device of Fig. 1.
Figure 3:
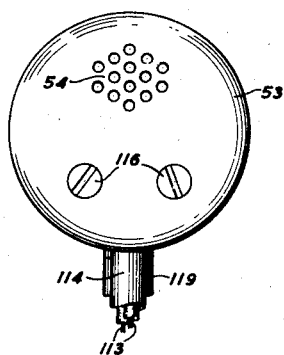
Fig. 3 is a rear view of the device of Fig. 1.
Figure 4:
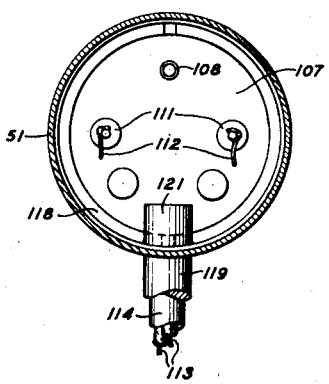
Fig. 4 is a sectional view of the device of Fig. 1 along the line 4—4 thereof.
Figure 12:
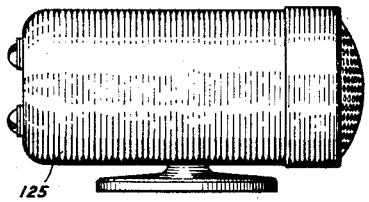
Fig. 12 is a side elevational view, actual size, of another embodiment of this invention.
Figure 13:
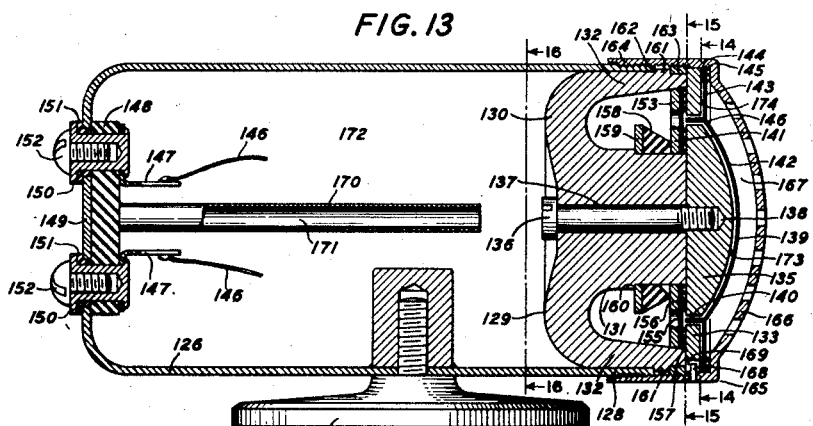
Fig. 13 is a sectional view of the device of Fig. 12, on an enlarged scale.
Figure 14:
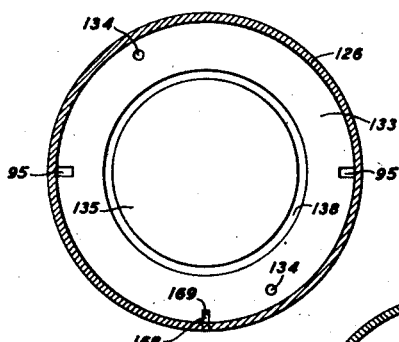
Fig. 14 is a sectional view taken along the line 14—14 of Fig. 13.
Figure 15:
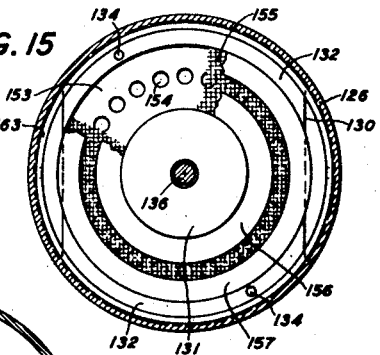
Fig. 15 is a sectional view taken along the line 15—15 of Fig. 13.
Figure 16:
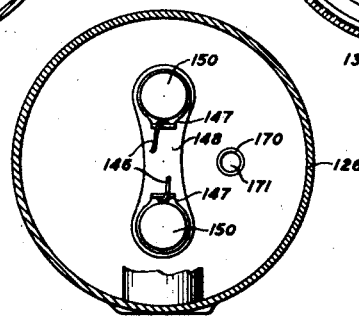
Fig. 16 is a sectional view taken along the line 16—16 of Fig. 13.
Figure 17:
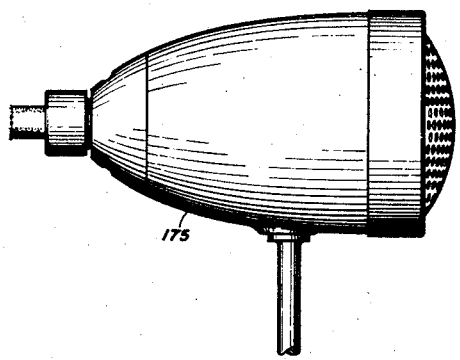
Fig. 17 is a side elevational view, actual size, of still another embodiment of this invention.
Figure 18:
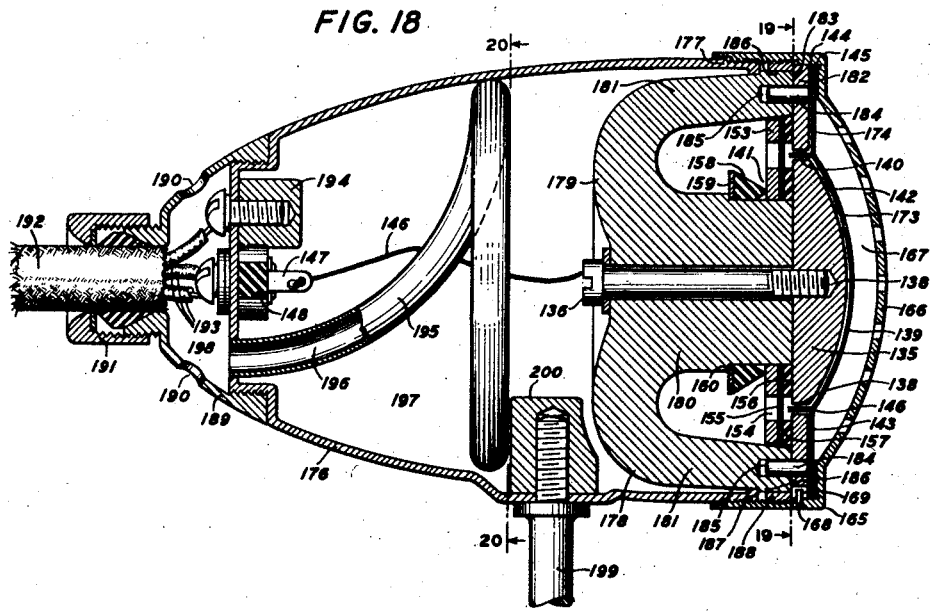
Fig. 18 is a sectional view of the device of Fig. 17, on an enlarged scale.
Figure 19:
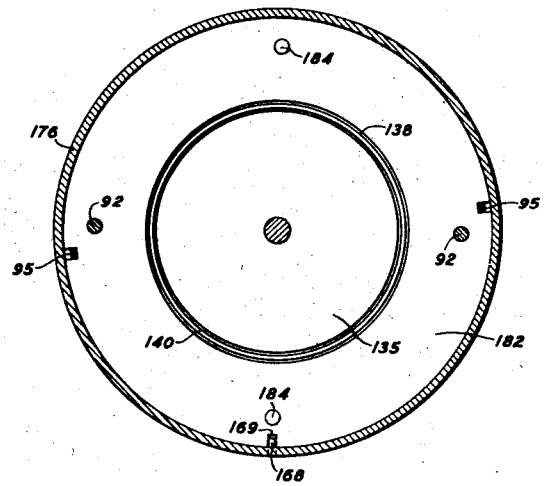
Fig. 19 is a sectional view taken along the line 19—19 of Fig. 18.
Figure 20:
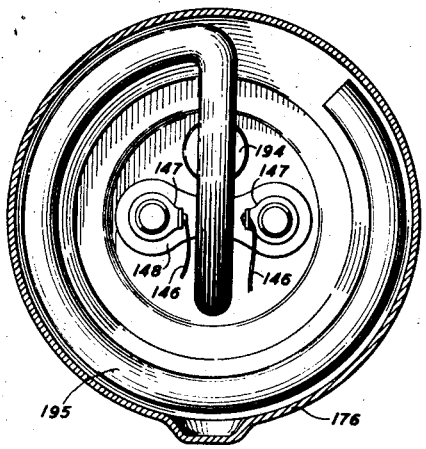
Fig. 20 is a sectional view taken along the line 20—20 of Fig. 18.
Figure 21:
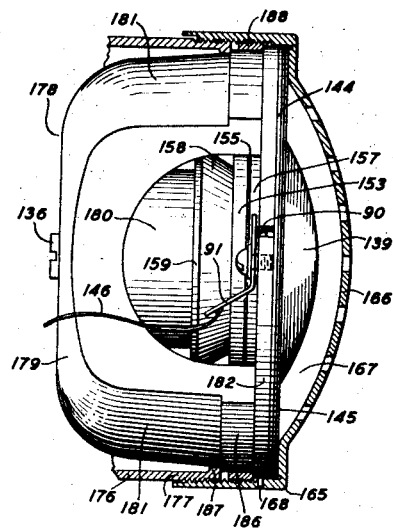
Fig. 21 is a view of an enlarged fragment of the front end of the device of Fig. 17 partly broken away and partly in section.

The acoustic device of Figs. 1-7, designated generally 50, comprises a microphone having a substantially cylindrical casing, housing, or enclosure 51, for instance, of brass, or other suitable material, consisting of a central cylindrical portion 52, a cap or cover end portion 53, containing a plurality of eccentrically disposed, closely grouped spaced apertures or perforations 54, and a cup-shaped end portion or member 55. The member 55 has a dished or dome-shaped portion or grid 56 containing a multiplicity of apertures or passages 57 through which sound waves may pass, and is internally threaded at its open end 58 to engage the externally threaded end portion 59 of casing portion 52.

The member 55 contains a magnet and diaphragm and coil assembly, generally designated 60, maintained in position by a pressure distributing ring or member 61 and a pressure exerting member or lock ring 62, threadably engaging the threaded open end 58 of member 55, with the front or outer surface of the diaphragm 63 exposed to sound waves that have access thereto through the apertures 57. The ring 61 has a peripheral slot 64 engaged by a pin member or projection 65 supported from the inner wall of the member, to prevent it from rotating when the lock ring is adjusted.

The magnet structure 66 comprises, preferably, a bar magnet 67, for instance, of cobalt steel, having end portions 68, bent or angularly disposed with reference to an intermediate straight portion 69 and engaged by a preferably annular plate pole 70, for instance, of cobalt iron, pin members 71 extending from the end portions 68 into an aperture 72 and a slot 73, that are located on the same diameter and on opposite sides of the central aperture in the plate pole. A preferably cylindrical center pole 74, for instance, of cobalt steel, is supported by the straight portion of the bar magnet, and carries a dome-shaped, center pole-piece or cap member 75, for instance, of cobalt iron. The bar magnet, center pole, and center pole-piece are secured together by any suitable means, for instance, screw 76, that extends through the passages 77, 78 of the magnet and center pole, and threads into the tapped drilling 79 of the center pole-piece. The peripheral portion of the member 75 is in spaced relation to the defining surface of the central aperture in the plate pole, and forms an annular air-gap 80 of uniform width therewith.

The diaphragm 63, which may be of any suitable material, for instance of aluminum, or an aluminum alloy, such as duralumin, comprises, preferably, a central, stiffened portion 81 and an outer annular portion 82, the central portion having a shape similar to that of the surface 83 of the center pole-piece. The diaphragm is spaced from the magnet structure by a spacing member or washer 84, preferably fastened, for instance, with cement or other suitable adhesive, to a peripheral annulus 85 of the diaphragm portion 82 to leave a flexible intermediate annulus 86. The spacing member, in turn, is fastened, for instance, with cement, to the outer peripheral portion of the plate pole. This expedient for mounting the diaphragm obviates the use of a diaphragm clamping ring and/or screws, and enables making the microphone much smaller in diameter. A spacing member or washer 87, preferably of a resilient, insulating material, such as rubber, is inserted between the outer surface of the diaphragm annulus 85 and the inside surface of the portion 55 and insulates as well as spaces the diaphragm and magnet structure from the casing.

An annular coil 88, preferably of edge wound insulated aluminum ribbon, is secured to the diaphragm at the junction 89 of the diaphragm portions 81, 82 and is disposed in the air-gap. The extremities of the coil leads 90 are secured, as by soldering, to terminal strips 91, insulatively mounted on the screws 92 which are insulatively fastened to the underside 93 of the plate pole at the peripheral portion of the latter. The leads may be brought out in any suitable manner, Figs. 8, 9, 10 and 11 showing various methods. In Fig. 8, the coil lead extends along the inner surface of the diaphragm portion 82, between the diaphragm portion 85 and the spacer 84, in the slots 94, 95 in the spacer 84 and plate pole, respectively, to the terminal strip 91 (Fig. 7). In Fig. 9, the coil lead is brought out between a pair of washers 96 of insulating material, such as paper, interposed between the spacer member 84 and the plate pole, all parts, however, being cemented together. In Fig. 10, the coil lead is brought out between the spacer member 84 and the plate pole. In Fig. 11, the plate pole is shown as provided with a peripheral ledge or flange 97 to which the diaphragm portion 85 is secured, as by cement, the coil lead being brought out between this ledge and the diaphragm. In each case, of course, the coil lead is insulated from the metallic parts either by being coated with an insulating varnish, or, if of aluminum, by having a surface layer of aluminum oxide thereon.

Acoustic damping means 98 is provided under the air-gap. This means comprises, preferably, a plate member or ring 99, of non-magnetic material, for instance, brass, containing a multiplicity of equally spaced openings or air passages 100 covered by a layer strip, or annulus of cloth 101, for instance, of silk. On one side and at its outer peripheral portion, it is spaced from the plate pole by a resilient member or sealing washer 102, and on its other or underside and at its inner peripheral portion, it is engaged by the upper end of a sealing or sleeve member 103 of resilient material, for instance, soft rubber, which fits about the cylindrical center pole and extends between the bar magnet and ring 99, and is under compression. The damping means provides an air passage connecting, through the air-gap, the chambers or spaces 104, 105 between the inner surface of the diaphragm and the magnet structure and the air chamber or space 106 provided by the casing. The provision of damping means under the air-gap is in accordance with the teachings of E. C. Wente Patent 1,766,473, granted June 24, 1930, and the use of silk cloth therein is in accordance with the teachings of A. L. Thuras Patent No. 1,964,606, issued June 26, 1934.

The casing chamber is divided into two compartments by a circular disc or partition member 107, of insulating material. Means for enhancing the low frequency response of the acoustic device is entirely enclosed by the casing on the rear side of the diaphragm and behind the magnet structure, and comprises a tubular member 75

108, relatively long in comparison with its diameter, providing a restricted passage 108a connecting the casing compartments. The member 108 is open at each end, and, at one end 109, fits into an opening in the partition member, and is suppored by the latter adjacent the apertures 54 in the rear end wall 110 of the casing. The use and function of such low frequency response enhancing means is in accordance with the teachings of A. L. Thuras Patent 1,869,178, granted July 26, 1932.

The partition member has a pair of terminal members 111 embedded thereon that connect with the terminal strips 91 through conductors 112, and with an external circuit through the conductors 113 of a cord 114. The cord is clamped between corrugated portions 115 of the members 53, 107, the member 53 being secured to partition member by any suitable fastening means, for instance, screws 116. The member 107 is externally threaded for engagement with the internally threaded portion 117 of the casing, and is maintained in adjusted position by the lock ring or member 18.

This embodiment of the invention may be mounted in any desired manner, for instance, at the top of a stand 119 having a threaded end portion 120 for engagement with a tapped portion 121 attached to the casing.

In operation, sound waves of all frequencies have access to the front side of the diaphragm through the apertured portion or grid 56 and the air chamber or space 122, and sound waves of frequencies at the lower end of the speech and music range, at least, have access to the rear side of the diaphragm.

The embodiment of this invention shown in Figs. 12 to 16 comprises a microphone, generally designated 125, comprising a substantially cylindrical casing, housing, or enclosure 126, carried by any suitable support, for instance, a pedestal 127, adapting it for desk or table mounting. At one and the open end 128 of the casing, is supported a magnet and diaphragm and coil assembly, generally designated 129.

This assembly comprises a substantially E-shaped magnet 130, for instance, of cobalt steel, having a center pole 131, and outer poles 132; an annular plate pole 133, for instance, of cobalt iron, supported on the poles 132, and engaged by pin members 134 extending therefrom; a dome-shaped center pole-piece or cap member 135, for instance, of cobalt iron, secured to the center pole by a screw member 136 that extends through the center pole passage 137 and threads into the tapped drilling 1380 of the cap member, the cap member and plate pole defining an air-gap 138 of uniform width; a diaphragm 139; a coil 140, attached to the diaphragm and disposed in the air-gap; and damping means 141, positioned under the air-gap.

The diaphragm, which may be of any suitable material, for instance, aluminum, or an aluminum alloy, such as duralumin, comprises a central portion 142, preferably stiffened and dome-shaped, and an outer portion 143, preferably annular, planar and flexible. It is fastened at its peripheral portion, preferably by a cement, to a spacing member or washer 144, which is fastened, preferably, by a cement, to the peripheral or marginal portion of the plate pole. A second spacing member or washer 145 of resilient material is supported on and preferably fastened to the outer surface of the peripheral portion of the diaphragm.

The coil 140, similar to the coil 88, is attached to the diaphragm at the junction 146 of the portions 142, 143. The coil leads (not shown) may be brought out in any one of the ways shown in Figs. 8 to 11, and are connected through conductors 146 with terminal members 147 that are supported on a terminal block 148, of insulating material. This block is secured to the rear and end wall 149 of the casing by metallic bushings 150 that are insulated by the collars 151, from the casing, the external ends of the bushings being tapped to receive screws 152 for securing conductors (not shown) for connecting the device in an electrical circuit.

The damping means, functioning as does the damping means 98, comprises a plate member or ring 153 containing a plurality of apertures on air passages 154, preferably equally spaced, covered by a strip 155 of cloth, preferably annular and of silk. Sealing members or washers 156, 157 are inserted between the inner and outer peripheral portions of the plate and cloth and the under-surfaces of the cap member and plate pole, respectively. On its under-surface and at its inner peripheral portion, the plate 153 is engaged by a sealing annulus or member 158 of resilient material, under compression between the plate. The member 158 rests on a supporting plate or member 159 carried by the center pole 131 on the shoulder or ledge 160.

The magnet is provided on the outer surfaces of its outer poles 132 with ridges 161 that are adapted to engage with and rest against the rim 162 of the open end of the casing. An externally threaded ring member 163 makes a force fit with the magnet above these ridges, and is adapted to be threadably engaged by the annular, internally threaded, flange portion 164 of the casing cap member 165 which threads, also, onto the open end of the casing. The cap member 165 has a dome-shaped, grid or apertured portion 166, of contour similar to that of diaphragm portion 142 and forming an air chamber or space 167 with the diaphragm. To maintain this chamber constant in size even though the cap member or the assembly 129 should alter its position after assembly, a pin member 168 is inserted in an aperture in the flange portion 164. It engages with a slot 169 in the plate pole. Movement of the cap member, therefore, causes a corresponding movement of the assembly 129, and vice versa.

The casing entirely encloses on the rear side of the diaphragm and behind the magnet, low frequency response enhancing means. This means, functioning in a manner similar to the tubular member 108, comprises an elongated, tubular member 170, of restricted cross-section, open at each end to define a passage 171, and supported at one end in an opening in the casing rear wall. It connects the atmosphere outside the casing with the air chamber 172 of the casing, and, through such chamber, the damping means, and the magnet air-gap, with the chambers or air spaces 173, 174, between the inner surface of the diaphragm and the center pole-piece and the plate pole.

In operation, the device of Figs. 12 to 16 is placed in a sound field and sound waves of all frequencies have access to the front side of the diaphragm through the grid 166 and chamber 167, while sound waves of frequencies in the lower end of speech and music range, at least, have access to the rear side of the diaphragm through the tubular member 170.

The embodiment of this invention illustrated by Figs. 17 to 21 comprises an acoustic device, generally designated 175, having a substantially parabolic-shaped casing, housing or enclosure 176. At the externally threaded, larger, open and front end 177 is supported a magnet and diaphragm and coil assembly, generally designated 178.

This assembly is similar, in some respects to assembly 129, like parts bearing corresponding numerals. The magnet 179, for instance, of cobalt steel, comprises a center pole 180 and outer poles 181. A plate pole 182, preferably annular and of cobalt iron, is supported on the flat, upper surfaces 183 of the outer poles. Pin members 184 depend from the plate pole and fit into depressions or drillings 185 in the outer poles. The outer poles are provided with ridge portions 186 at their upper extremities for engagement with the rim 187 of the casing. An externally threaded ring member 188 is securely attached to the magnet, and engages with the internally threaded flange portion of the casing cap member 165.

At its rear end, the casing is provided with a removable cap member 189 containing sound wave passing apertures 190, and having a stuffing box attachment 191 through which is drawn the cord 192 containing conductors 193 for connecting the device with an electrical circuit. The casing is here shown grounded at 194 through one of the conductors. Low frequency response enhancing means, functioning as do members 108 and 170 and comprising an elongated tubular member 195, open at each end and defining a restricted passage 196 connecting the air chambers or spaces 197, 198, is entirely enclosed and supported by the casing on the rear side of the diaphragm and behind the magnet structure. Coiling the tubular member permits a tubular member of considerable length to be confined in a small volume.

In use, the device of Figs. 17 to 21, may be carried on a suitable support 199 threadably coupled to the casing member 200, and placed in a sound field. Sound waves of all frequencies have access to the front side of the diaphragm through the grid 166 and the chamber 167, while sound waves of low frequency have access to the rear side of the diaphragm through the casing apertures 190 and the tubular member 195.

Figure 22:
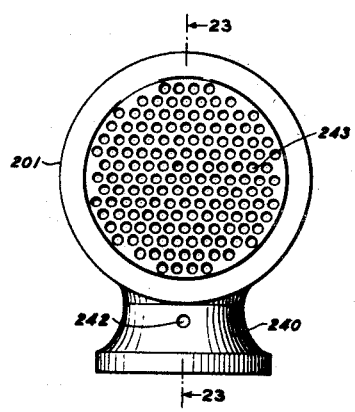
Fig. 22 is a front elevational view of an acoustic device constituting another embodiment of this invention.
Figure 24:
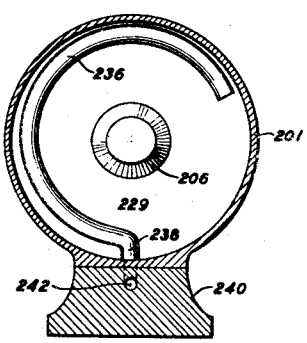
Figure 23:
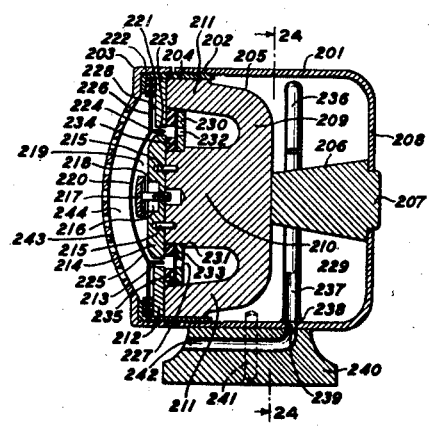
Fig. 23 is a sectional view of the device of Fig. 22, along the line 23—23, thereof; and, Fig. 24 is a sectional view taken along the line 24—24 of Fig. 23.

The embodiment of this invention shown in Figs. 22 to 24 comprises a casing, housing or enclosure 201 having an internally threaded open end portion 202 coupled to an apertured casing cap or grid member 203 by an externally threaded coupling ring member 204. A magnet and diaphragm and coil assembly 205 is maintained in position at the front end of the casing between the member 204 and a frusto-conically shaped block member 206 having a circular raised portion 207 fitting into a central aperture in the rear wall 208 of the casing.

The magnet 209, for instance, of cobalt steel, comprises a center pole 210, and outer poles 211. A plate pole 212, preferably annular and of cobalt iron, is supported by the outer poles and defines an annular air-gap 213 of uniform width with a center pole-piece 214 supported on the center pole and held in position by pin members 215. The pole-piece 214 contains an air chamber 216, and supports a plate member 217 providing a restricted annular slot 218 connecting the chamber 216 and the air chamber or space 219 between the diaphragm 220 and the center pole-piece.

The diaphragm 220 is similar in shape and material to the diaphragms of the other devices described, and it is fastened at its peripheral portion, as by cement, to a spacing member or washer 221 which is fastened, as by cement, to the peripheral or marginal portion of the plate pole. A spacing and insulating washer 22, for instance, of soft rubber, is interposed between the peripheral portion of the diaphragm and the coupling ring, and may be fastened, as by cement, to the diaphragm.

A coil 223, similar to that of the other devices described, is secured to the diaphragm at the junction 224 of the central and outer portions 225, 226 of the diaphragm, and is disposed in the air-gap 213. The coil leads (not shown) may be brought out in the manner illustrated by either of Figs. 8 to 11, or in any other suitable way.

Damping means 227 is supported under the air-gap, and provides a passage connecting, through the air-gap, the air chambers or spaces 219, 228 with the air chamber or space 229 defined by the casing. The damping means comprises a plate member or ring 230 of non-magnetic material, supported at its inner periphery on a ledge or shoulder 231 formed in the center pole 210, and containing a plurality of apertures 232, preferably equally spaced, and covered with a strip of cloth 233, for instance, an annulus of silk. Sealing washers 234, 235, preferably of resilient material, such as rubber, are interposed between the inner and outer peripheral portions of the cloth and plate and the under-surfaces of the center pole-piece and plate pole, respectively.

Low frequency response enhancing means 236 is supported entirely within the casing to the rear of the diaphragm and behind the magnet structure, and comprises an elongated tubular member open at each end to define an air passage 237, and connected at one end 238 to the casing in alignment with an aperture 239 in the casing leading to the atmosphere outside the casing. In the device of Figs. 22 to 24, the base or pedestal 240, providing a support for the casing and secured thereto by any suitable means, for instance, the screw 241, contains an air passage 242, leading to the opening in the casing, and constituting, in effect, a continuation of the tubular member 236.

In use, the acoustic device is placed in a sound field and sound waves of all frequencies have access to the front side of the diaphragm through the grid 243 and the air chamber or space 244, and sound waves of low frequency have access to the rear of the diaphragm through the pedestal passage and the tubular member. The provision in this embodiment of the invention, of the center pole-piece slot and chamber, the damping means under the air-gap and the low frequency enhancing means, is in accordance with the teachings of A. L. Thuras Patent 1,847,702, granted March 1, 1932.

This invention simplifies the structure of acoustic devices of the electrodynamic type, renders their assembly more facile, enables a marked reduction in diameter of the magnet structure and diaphragm thereof, obviates the use of clamping rings and screws in mounting diaphragms therefor, and improves their operating characteristics.

While this invention has been disclosed with reference to various specific embodiments, it will be understood that it is capable of other modifications without departing from the scope of the invention, which is to be considered as limited, therefore, by the appended claims, only.

What is claimed is:

1. An acoustic device comprising a diaphragm, a magnet, a plate pole supported by said magnet and carrying said diaphragm, said diaphragm being secured at its peripheral portion to said plate pole, a center pole forming an air-gap with said plate pole, a coil attached to said diaphragm and disposed in said air-gap, a casing for said diaphragm, magnet, poles and coil, said casing having a perforated sound wave passing portion in spaced relation to said diaphragm, and means to maintain constant the spacing between said diaphragm and perforated portion on displacement of either, said means comprising a projection on said casing engaging with a slot in the peripheral portion of said plate pole.

2. An acoustic device comprising an assembly comprising a diaphragm, a magnet structure having a plate pole and a center pole member defining an air-gap, a coil attached to the diaphragm and disposed in the air-gap, and means secured to and securing said diaphragm in spaced relation to said magnet structure, a casing for said assembly having a sound wave passing portion in spaced relation to which the diaphragm is disposed, pressure distributing means in said casing and bearing against said magnet structure to force said assembly toward said sound wave passing portion, said means being restrained against movement other than along its axis, and pressure exerting means acting upon said distributing means.

3. A transmitter comprising a casing having an opening at each of its opposite ends, the side walls of said casing being imperforate, a transmitter including a diaphragm and a magnet mounted in one end of said casing, said diaphragm sealing the opening in one end of the casing, an apertured partition in said casing between said magnet and said other end of said casing, dividing said casing into two chambers, and a tubular member in one of said chambers acoustically connecting the rear side of the diaphragm with the open air via the apertured partition and the opening in said other end of said casing.

4. A transmitter comprising a casing having openings at opposite ends only, an apertured wall member in said casing dividing it into two chambers, a transmitter unit including a diaphragm and a magnet in one of said chambers, said diaphragm being adjacent the opening in one end of said casing and entirely closing said one end of said casing, and a tubular member in one of said chambers between said magnet and the other open end of said casing acoustically connecting the rear side of the diaphragm with the open air only through said other open end of said casing.

5. A transmitter comprising an elongated case open at each end, a transmitter unit at one open end including a magnetic structure and a diaphragm closing said one open end, means bearing on said magnet structure to hold it in position in said case, an apertured partition in said case adjacent the other open end of the case, spaced from said unit and dividing the case into two chambers connected by an aperture in the partition, and an elongated tubular member open at each end supported on said partition and providing a continuation of said aperture.

6. An acoustic device comprising a casing open at each end, a diaphragm in said casing and closing one open end, a partition closing the other end of said casing and having a single sound wave passing aperture therein, low frequency enhancing means supported on said partition in alignment with the aperture therein, and a cover member forming a chamber with said partition, said cover member containing an aperture connecting the chamber with the air outside the casing.

7. An acoustic device comprising a casing, a diaphragm, a coil attached to said diaphragm, a magnet structure having an air gap in which said coil is positioned, a partition member in said casing dividing it into two chambers, said diaphragm, coil and magnet structure being positioned in one chamber, the other chamber being connected with the atmosphere through an opening in the casing, and said partition member having a passage therein connecting the two chambers, and an elongated tubular member inside said case, entirely to the rear of said magnet structure and supported on said partition member in alignment with the passage therein.

8. An acoustic device comprising a casing having a central elongated portion open at one end and having a partition extending across its other end, said partition having a single sound wave passing aperture therein and supporting an elongated tubular member providing a continuation for said aperture, a cover member engaging the partition end of said central portion to form an air chamber therewith, said cover member having a sound wave passage therein leading to the atmosphere outside said chamber, a cup-shaped end portion engaging the open end of said central portion, said end portion having a perforated area, a diaphragm positioned behind said perforated area, a coil attached to and movable with said diaphragm, and a magnet structure supported by said end portion and having an air gap for said coil.

9. An acoustic device comprising an elongated cylindrical portion open at each end, a partition member disposed across one open end, said partition member having a single sound wave passage and supporting an elongated tubular member in alignment with said passage, a cover member engaging the partition member end of said cylindrical portion to define an air chamber with said partition member, said cover member having a sound wave passage connecting the chamber with the outside air, a cup-shaped portion closing the other open end of said cylindrical portion, said cup-shaped portion having a perforated sound wave passing area, and a moving coil transmitter unit supported within said cup-shaped portion and having a diaphragm positioned behind said perforated area.

ROBERT N. MARSHALL.